United States Patent [19]

Rainey, Jr.

[11] Patent Number: 5,259,809
[45] Date of Patent: Nov. 9, 1993

[54] APPARATUS FOR HARVESTING SHRIMP

[76] Inventor: Don E. Rainey, Jr., 669 Mitchell Dr., Biloxi, Miss. 39532

[21] Appl. No.: 843,316

[22] Filed: Feb. 28, 1992

[51] Int. Cl.$^5$ .............................................. A01K 61/00
[52] U.S. Cl. .......................................... 452/1; 43/100; 119/213
[58] Field of Search ............................ 452/1; 119/2, 3; 43/100, 101

[56] References Cited

U.S. PATENT DOCUMENTS

| | | | |
|---|---|---|---|
| 3,951,104 | 4/1976 | Neff | 43/100 |
| 3,998,186 | 12/1976 | Hodges | 119/2 |
| 4,212,268 | 7/1980 | Chapman | 119/2 |
| 4,819,369 | 4/1989 | Bodker | 43/102 |
| 4,905,405 | 3/1990 | Hendricks | 43/100 |
| 4,914,856 | 4/1990 | Kennedy | 43/100 |

FOREIGN PATENT DOCUMENTS 54816  6/1937  Norway ........................ 43/100

Primary Examiner—Willis Little

[57] ABSTRACT

A trap capable of harvesting commercial quantities of shrimp in the open ocean or in ponds is a wire mesh cage having shrimp capture gates in the form of truncated prisms, each sized to admit desired shrimp but exclude predatory fish. The inner end of each gate has a transparent hinged flap which swings away to admit a shrimp; to encourage the shrimp's entrance, a gap, sufficient to pass the shrimp's feelers, is left below the flap in the gate. An attractor is provided in the harvester to attract plankton or similar shrimp food organisms. The resulting higher density of plankton at the harvester rapidly attracts shrimp. The mesh construction of the cage permits free flow of water currents, and rapid build up of plankton. The mesh is also opened at least at the bottom of the harvester, to provide size selection, by permitting the ready escape of immature shrimp of small size. In tests, the harvester has filled with white shrimp in several hours, demonstrating the high productivity and fast harvesting possible with the harvester. The inventive harvester may be set, as with crab traps, in lines or arrays, some floating and some bottom located, as found best in the environment for yield. This eliminates the environmental destruction caused by trawl netting of shrimp.

9 Claims, 3 Drawing Sheets

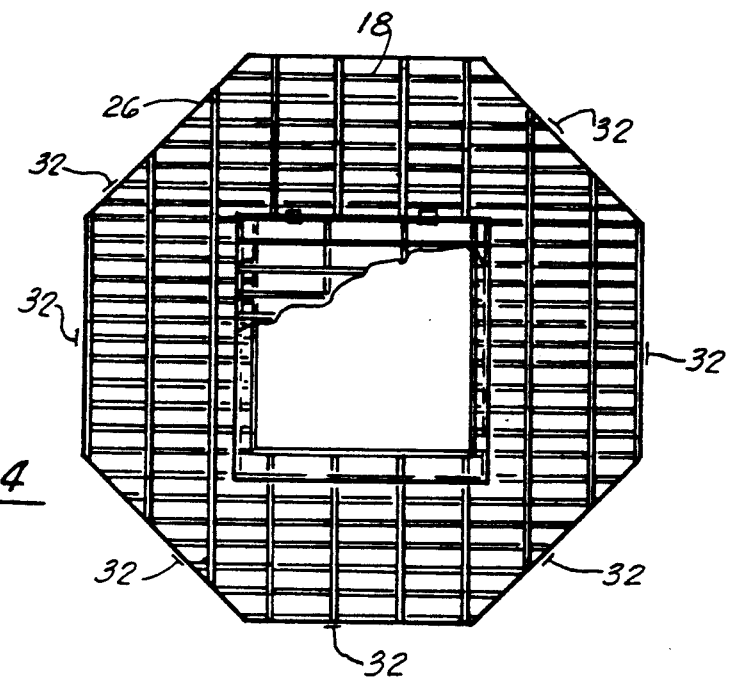
*FIG. 4*
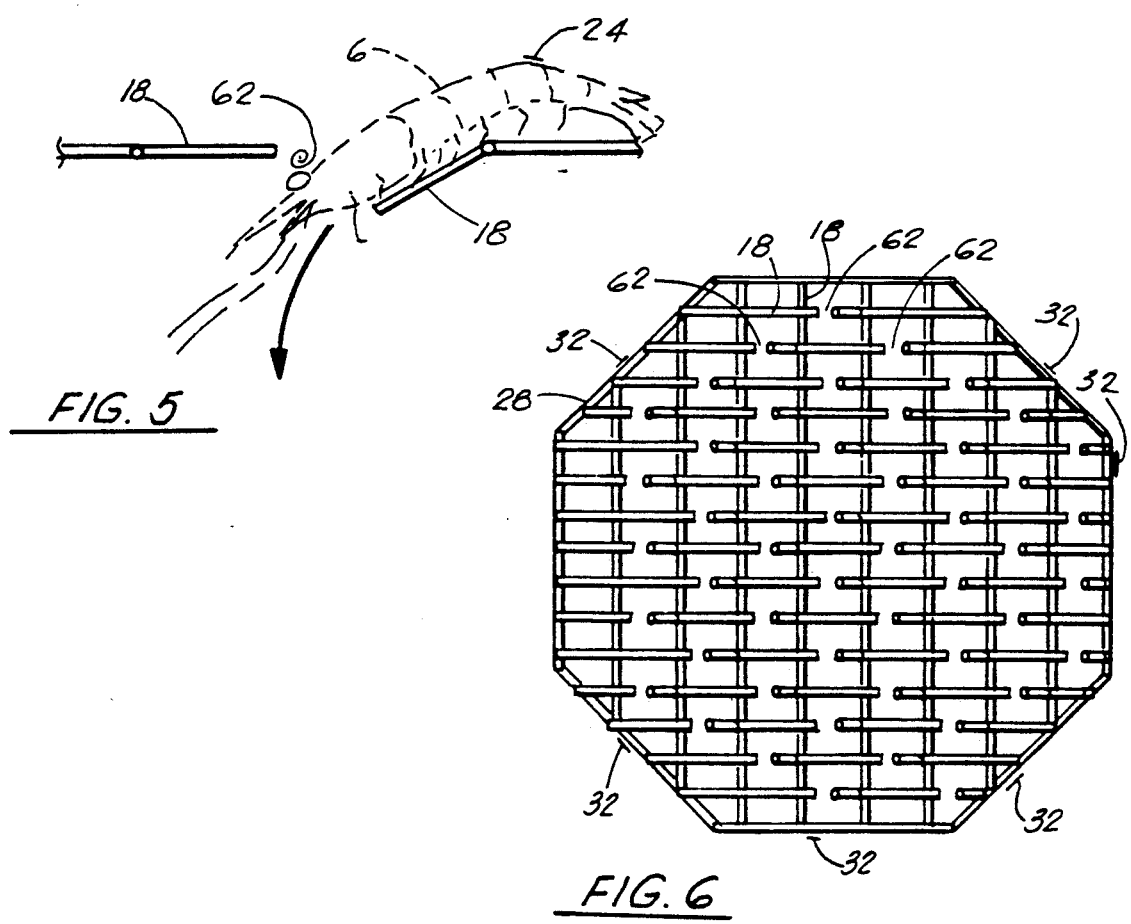
*FIG. 5*
*FIG. 6*

APPARATUS FOR HARVESTING SHRIMP

BACKGROUND OF THE INVENTION

This invention relates to the capture, in open waters, of commercial quantities of shrimp. The standard method of capture of live shrimp for harvesting is by means of trawl nets, which are dragged through the water and which capture all ocean organisms larger than the mesh of the trawl. Since shrimp are often bottom feeders, these nets include drag chains or other mechanisms which serve to scrape the sea floor. An unavoidable consequence of such technique is that everything is caught and killed. This by catch often amounts to as much as 90% of a trawl, and often constitutes immature members of valuable food fish, all of which are killed.

There is at least one patent for fixed traps for shrimp, is U.S. Pat. No. 2,908,993 to Webb disclosing a bait trap with an internal electric light and a funnel entrance. The overall trap is of a solid transparent plastic.

U.S. Pat. No. 2,898,698 to Bair shows a fish trap having an inverted funnel entrance.

In fishing, the use of combinations of light, scent and sound as a attractor is shown. Patents include U.S. Pat. No. 3,680,245 to Brooks, U.S. Pat. No. 3,177,164 to Ewing, and U.S. Pat. No. 4,227,331 to Ursrey. U.S. Pat. No. 4,697,374 to Simms discloses the use of a blue green light with light pulsations to attract fish.

U.S. Pat. No. 4,638,584 to Lindsay discloses, in lures, the insertion of a chemi-luminescent capsule material to make the bait attractive. This patent also discloses the use of transparent patterns to simulate scales or other desired patterns in the body, implying the use of such a visual attractant on fish and similar predators.

U.S. Pat. No. 3,918,190 discloses the injection of a chemi-luminescent liquid to cause live bait to glow. In this patent it is also disclosed that separate chemi-luminescent capsules may be inserted within a preexisting bait. This patent specifically refers to the American Cyanamide Cyalume $M^l$ product.

U.S. Pat. No. 3,921,328 to Holcombe, and U.S. Pat. No. 4,610,103 to Steinman disclose a chemi-luminescent illumination of a lure.

Four patents to Mattison, U.S. Pat. Nos. 4,777,756; 4,751,788; 4,800,670 and 4,693,032 disclose various forms of adapting a lure to utilize a chemi-luminescent capsule or tube.

Each of the above patents teach the selection of the illumination to attract the desired end fish to be caught, and imply that this requires a specific type and appearance of illumination. There is no discussion of light intensity, and no indication that large quantities of desired catch may be made by usual means; to the contrary, the usual item taught is a sport fishing lure, implying capture of individual fish.

SUMMARY OF THE INVENTION

The invention is of a trap which may be deployed in the open ocean and which has demonstrated the ability to rapidly and selectively capture large quantities of desired size shrimp while eliminating the capture of undersized shrimp and largely eliminating the capture of by catch. The trap has been tested in marine environments, and for free swimming shrimp of the desired size, rapidly fills within several hours to maximum capture. The amount of by catch is negligible, and immature shrimp are not damaged, but are freed to grow to maturity. The trap therefore provides for the first time a practical alternative to trawl netting for the capture of commercial quantities of food shrimp, and at the same time largely eliminates the losses of associated marine organisms which occurs with standard trawling techniques.

The traps of the invention also provide a suitable capture mechanism for pond raised shrimp or aquiculture shrimp farming. The ability of the trap to harvest a desired size larger shrimp, and not damage smaller immature shrimp can be especially valuable in a pond environment; the prior art generally requires that a pond be harvested by total trawl netting of all the shrimp in the pond, with consequent loss of immature shrimp which have limited value, and must be discarded.

It is thus the object of this invention to disclose a trap which will harvest commercial quantities of shrimp.

It is a further object of the invention to disclose an apparatus which will harvest commercial quantities of shrimp without destruction of by catch or immature species.

It is a further object of the invention to disclose an apparatus that will harvest commercial quantities of shrimp without the use of a trawl net of bottom dragging rig.

It is a further object of the invention to disclose an apparatus that will harvest commercial quantities of shrimp that can be set in lines or used as a portable harvester.

It is a further object of the invention to disclose an apparatus that will harvest commercial quantities of shrimp with significantly reduced consumption of gas and oil, and with less boat traffic in sensitive costal and estuarine areas.

These and other objects and advantages of the invention will be seen from the detailed description which follows.

BRIEF DESCRIPTION OF THE FIGURES

FIG. 4 is a top view of the top plate of the invention.

FIG. 5 is a detail of an immature sized shrimp escaping through the selector.

FIG. 6 is a view of the bottom plate of the invention.

DETAILED DESCRIPTION OF THE INVENTION

Figure 1:
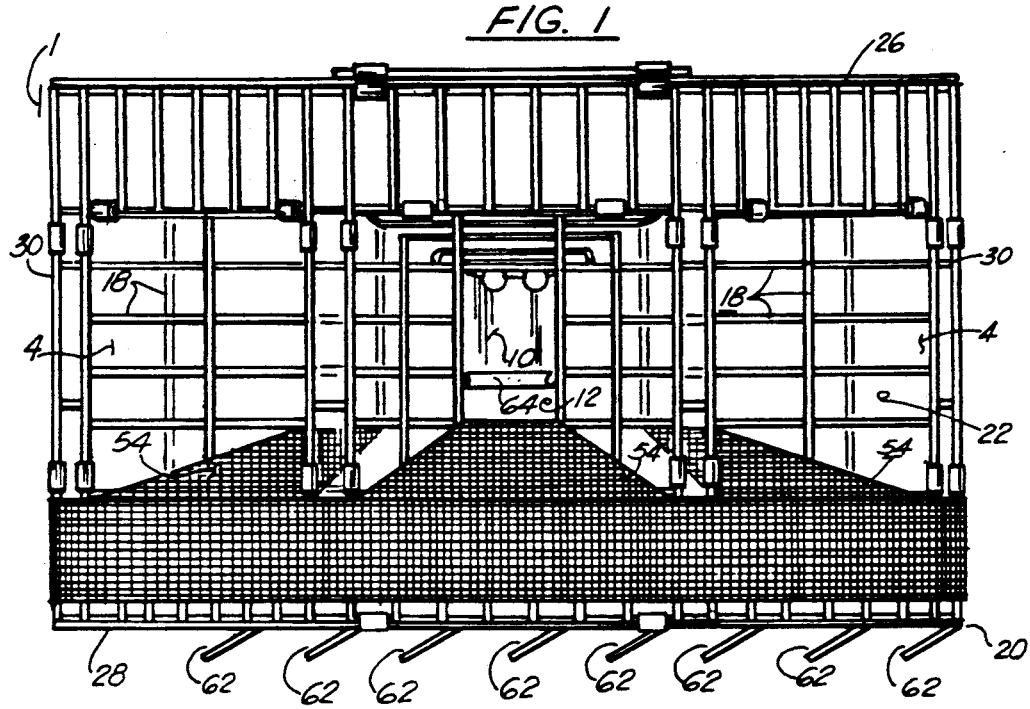
FIG. 1 is a side view of a cage of the invention.
Figure 2:
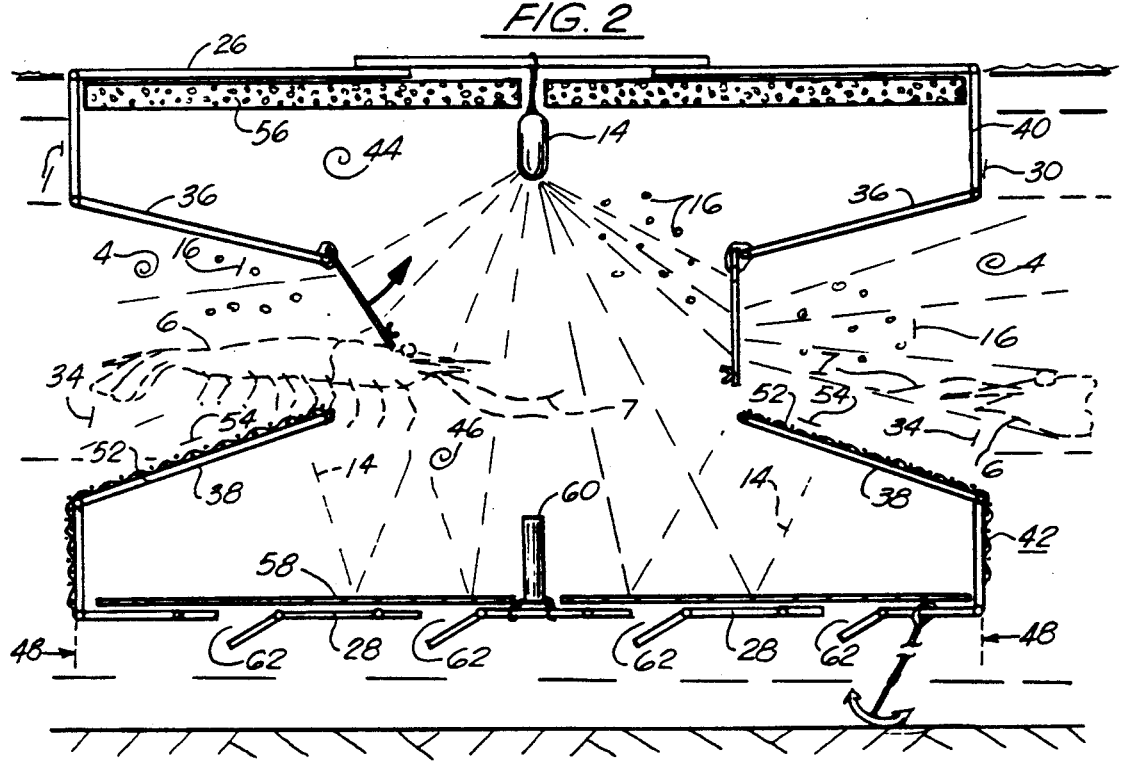
FIG. 2 is a side cut away view of the invention, set as a floating trap, capturing shrimp.
Figure 3:
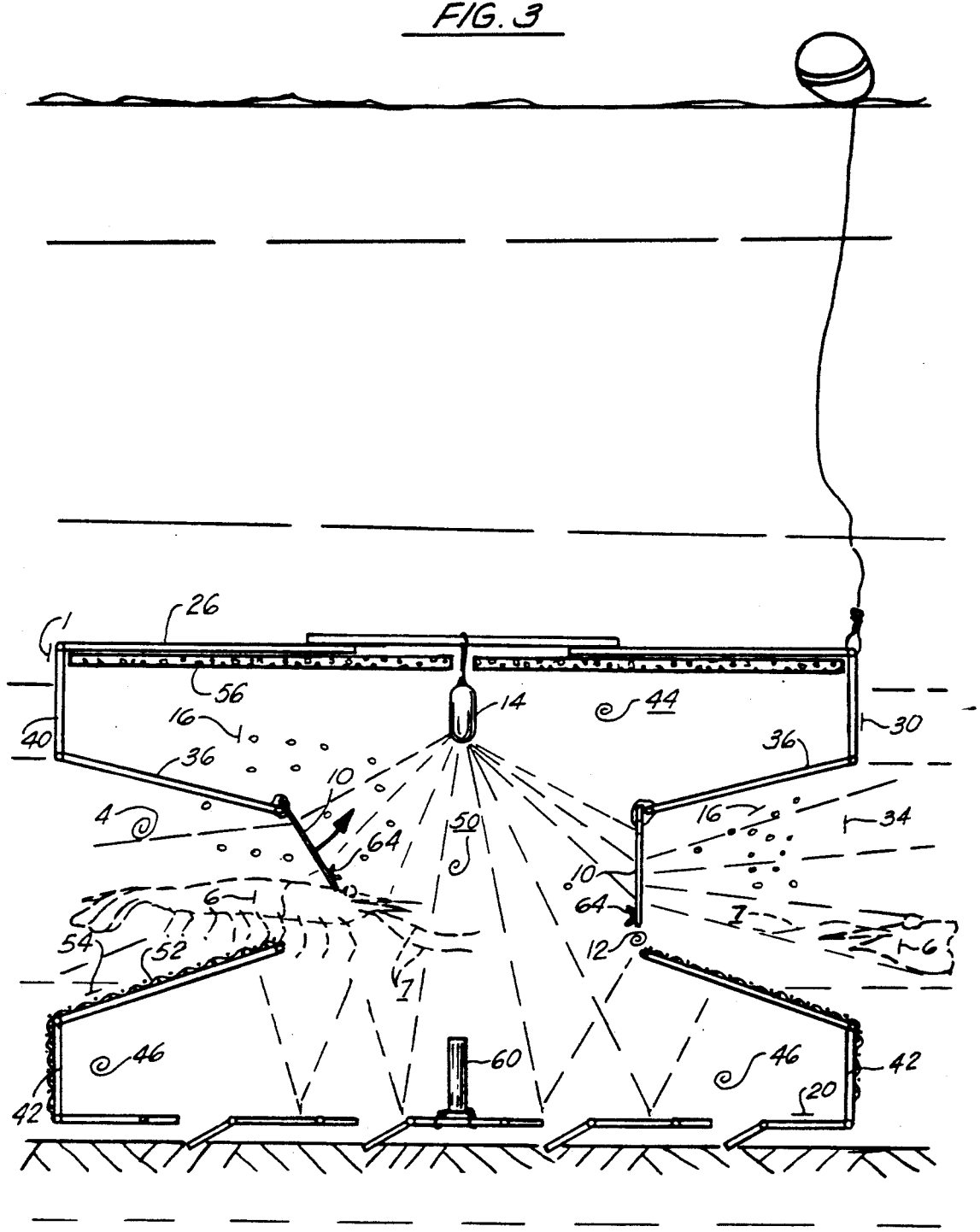
FIG. 3 is a side cut away view of the invention, set as a bottom dwelling trap, capturing shrimp.

A harvester 1 capable of harvesting commercial quantities of shrimp in the open ocean or in ponds is shown in the form of a wire mesh cage 2 having shrimp capture gates 4 in the form of truncated prisms, each sized to admit desired shrimp 6 but exclude predatory fish. The inner end 8 of each gate 4 has a transparent hinged flap 10 which swings away to admit a shrimp 6; to encourage the shrimp's entrance, a gap 12, sufficient to pass the shrimp's feelers 7, is left below the flap 10 in the gate. An attractor 14 is provided in the harvester 1 to attract plankton 16 or similar shrimp food organisms. The resulting higher density of plankton 16 at the harvester rapidly attracts shrimp 6. The mesh construction of the cage 2 permits free flow of water currents, and rapid build up of plankton 16. The mesh 18 is also opened 22 at least at the bottom 20 of the cage 2, to provide size selection, by permitting the ready escape of immature shrimp 24 of small size. In tests, the harvester 1 has filled with white shrimp in several hours, demonstrating the high productivity and fast harvesting possible with the harvester. The inventive harvester may be set, as with crab traps, in lines or arrays, some floating and some bottom located, as found best in the environment for yield. The trap eliminates the environmental destruction caused by trawl netting of shrimp.

The preferred embodiment of the invention is shown in the figures. As shown the shrimp harvester is a cage 2, of open wire mesh construction. The main body of the cage is formed between a top plate 26 and a similar shaped bottom plate 28, each constructed of an open wire mesh 18, of substantially strong and corrosion resistant wire. In the preferred embodiment, each plate is polyhedral, and the plates and sides are constructed of a steel wire, corrosion proofed by a suitable marine coating, which may be either a paint or an enamel coating.

The typical cage 2 is between one and two feet across the top, and the top plate 26 and bottom plate 28 are connected by a side member 30, to produce a cage 2 which is between one and two feet high.

The polyhedral shape of the top or bottom plate causes the side member 30 to be a succession of straight line sections 32. Within each of these sections 32 is formed a shrimp capture gate 4, with a typically square entrance. As shown in the cut away figure, each gate 4 is in form an inward extending truncated prism, ending in a smaller, square gate or trap opening 8 at its inner end. Each trap opening has a top 36 defined by the top 26 of the cage 2; likewise, this orientation defines a bottom surface 38 of the shrimp capture gate 4.

If the top plate 26 and bottom plate 28 are round rather than polyhedral, the side member 30 is simply a closed curved surface. The shrimp capture gates 4 are then spaced along the side member 30 in a periodic array.

In either case, the shrimp capture gates 4 are generally centered top to bottom on the side member 4, leaving a top side area 40 and a bottom side area 42. As most easily seen in cross section, this creates two internal areas, a top swimming area 44 and a bottom swimming area 46 within cage 2. Top swimming area 44 and bottom swimming area 46 are separated by the inward protrusion of the shrimp capture gates 4, and are of greater diameter 48 than the entrance zone 50 of the cage adjacent the shrimp capture gates 4.

The cage 2 is constructed of an open mesh 18 as described. This mesh 18 is a relatively open construction, having openings sufficiently large in proportion to the size of the cage 2 that most small organisms can freely pass into and out of the cage 2, and such that the cage 2 provides little resistance to the flow of water.

Each of the shrimp capture gates 4 is of the form of a sideways truncated prism, extending inward in the side member 30, from gate entrance 34 to trap opening 8. The gates 4 have a defined bottom 52; at least the bottom 52 is covered with a fine mesh screen 54 which is of a mesh fine enough that shrimp may easily walk on it. A mesh screen 54 is preferred to a solid surface in order to reduce the force of water currents on the cage 2 and to enhance circulation of water throughout the cage 2; however a solid textured surface would also be suitable for the bottom 52 of the gate 4.

Gate inner trap opening 8 is partly closed off by a hinged flap 10, hinged to the cage mesh 18 at the top of the trap opening 8; flap 10 is hinged to open under pressure inward into the cage 2, but normally closes against the trap opening 8. Flap 10 is preferably a solid transparent plastic material. Flap 10 extends down across most of the trap opening 8 but does not cover all of the opening 8; an open gap 12 is left at the bottom of the trap opening 8.

Since flap 10 is solid, it would be sensitive to water currents, especially as flap 10 should be light in weight so as to be easily pushed by a crawling shrimp. It has been found that fixing a vortex generator to the bottom edge of flap 10 creates sufficient back flow to greatly reduce the tendency of flap 10 to lift under the influence of usual tidal currents. Such a vortex generator 64 may be provided by gluing a small tubing section or other rough protruding member across the bottom of flap 10.

Within cage 2 is placed a plankton attractor 14. This is a means for increasing the concentration of plankton 16 in the immediate vicinity of the cage 2. Plankton 16 are here meant to refer to all the small swimming organisms which are at the bottom of the marine food chain; they constitute the food source on which shrimp feed. A suitable plankton attractor has been found to be a diffused yellow green light with limited intensity. A high intensity light will actually disperse plankton 16. Experimental use has indicated that a medium sized chemo-luminescent light will serve as an adequate source, having both the diffused effect and the limited intensity. A medium wattage ultraviolet light has also been shown to be effective. In as much as ultraviolet light has limited transmission through water, a higher source intensity may be used, as the intensity rapidly diffuses and its attenuated to a suitable luminance.

The effect of plankton attractor 14 may be augmented by a food attractor 60, which may be a tube containing food mounted within the cage 2, with holes through which the food attractor gradually diffuses into the water. An equal effect may be achieved by periodically broadcasting marine food into the water in the immediate vicinity of the harvesters 1.

In order to concentrate the plankton 16 in the vicinity of the capture cages 4, since they would otherwise uniformly disperse around the attractor 14, the light is masked so that is directed primarily through the gates 4. For a floating harvester 1, this may be best done by an upper float 56 which also serves to float the cage 4 within the water.

Upper float 56 may be a sheet of foam cut to fit within cage 4. The buoyancy of float 56 may be modified by changing its thickness. Float 56 may be made sufficiently buoyant to float harvester 1, in which case harvester 1 is suspended a distance above the sea floor, with an anchor and line to secure the harvester at a chosen depth. In the case of such a free floating harvester 1, an opaque bottom plate 58 is fitted above the cage bottom plate 28 to mask the light of the plankton attractor 14.

Float 56 may be of an insufficient buoyancy to float the harvester 1, in which case harvester 1 will descend to the sea floor. In this case float 56 serves to retain the orientation of harvester 1, top up, as it descends. Float 56 and the sea floor then serve to mask the plankton attractor 14.

In use an array of the harvesters 1 may be deployed at varying depths within a chosen area. Typically, the prime areas of shrimp are those areas of the sea which are most sensitive; areas of sea grass, relatively shoal water with many immature fish and marine species. An anchored array of the harvesters 1 may be set and removed with minimal disruption of the ecology of such waters, whereas trawling would largely destroy all marine organisms above a certain size, in the trawled areas as well as scraping the bottom, destroying important habitat.

A typical cage 2 illustrates the action of the harvester 1. The effect of the plankton attractor 14 is to concentrate marine plankton 16 in the vicinity of the harvester. Since the effect of the attractor 14 is masked, the concentration is greatest in the immediate vicinity of the capture gates 4. Shrimp 6, attracted by the plankton will swim to the capture gates. The fine mesh screen 54 at the bottom of the gate will encourage the shrimp 6 to walk forward into the gate 4. The gap 12 at the bottom of the inner trap opening 8 will pass the shrimp's feelers 7 and the shrimp 6 will proceed pushing through the flap 10 and entering the cage 2. Once inside the cage 2, the shrimp will naturally gravitate to the more open area of the top swimming area 44 or the bottom swimming area 46. The generally open mesh construction of the cage permits a healthy flow of water, and the plankton attractor insures a plentiful supply of food. The shrimp 6 therefore is maintained in a live healthy state until the harvester 1 is pulled form the water.

Since the attractor 14 is optimized for plankton, predatory fish are not attracted unduly to feed on the shrimp 6. By sizing the capture gates to the desired size of shrimp to be captured, predators, which are all much larger than the shrimp are excluded, and the shrimp are protected.

Since the cage 2 is of an open mesh 18 construction, all organisms smaller than the mesh 18 opening are flushed form the harvester when it is raised. Greater selectivity as to the size of shrimp captured may be achieved by providing a selector 62 in the cage 2, by providing along the bottom side area 42 or the bottom plate 28 larger openings through which undesirable small shrimp 6a may pass; again the outrush of water occurring when the harvester is raised will flush these smaller shrimp 6a free. Selector 62 may be easily made by cutting periodic numbers of the mesh 18 wires, bending the wires so cut outward to create larger openings sized to release such small shrimp.

In test use in a large marine test tank, the harvester 1 of the invention selectively harvested up to 90 percent of available shrimp of desired size in several hours without any significant by catch or damage to immature species.

I claim:

1. An immersed, static positioned harvester for shrimp comprising:
    an enclosed cage having a top plate and a bottom plate connected by a side member, at least said side member being open mesh permitting a free flow of water therethrough;
    an attractor for plankton within said cage;
    at least one shrimp trap gate within said side member having an inwardly directed truncated prismatic shape, presenting a wider entrance and a narrower trap opening;
    means, covering the bottom of said shrimp trap gate, to support the feet of a crawling shrimp; and
    a hinged shrimp trap on the trap opening;
    means for directing the effect of said plankton attractor towards said gate, comprising:
    a float plate covering substantially all of said top section, masking said attractor from the top, and
    a plate covering said bottom masking said attractor from the bottom, such that said attractor is only perceived through the side member.

2. The apparatus of claim 1 wherein said means for directing comprises:
    a float plate covering substantially all of said top section, masking said attractor from the top, and
    said cage being placed against a sea floor bottom, such that said sea floor bottom masks said attractor, such that said attractor is only perceived through the side member.

3. The apparatus of claim 1 further comprising said hinged shrimp trap comprises:
    a transparent flap hinged to swing upwards and inward to the cage;
    said flap extending down across the shrimp trap gate, but leaving an open area at the bottom of the shrimp trap gate:
    a vortex generator across the bottom of the transparent flap, such that current flow past the flap creates vortices which reduce the tendency of the flap to be displaced from a vertical orientation by the current flow.

4. The apparatus of claim 1 further comprising:
    a container interior to the cage containing therein an odor based shrimp attractor, said container having openings to emit said attractor into the water adjacent the cage.

5. An apparatus for harvesting shrimp in an ocean environment comprising:
    an open mesh cage having a top and a bottom in the shape of polyhedra, interconnected by a plurality of flat sides;
    each of said flat sides being a truncated prism defining an opening and an inwardly extending shrimp gate;
    each said shrimp gate being closed at in inner end by a hinged transparent flap;
    means on each gate for encouraging the walking motion of shrimp;
    means on each gate for encouraging the inward motion of shrimp feelers past the flap; and
    means for releasing undersized catch.

6. The apparatus of claim 5, said means comprising:
    the mesh of said cage having periodic openings of a size to permit ready escape by marine organisms of a size smaller than a desired caught shrimp size.

7. The apparatus of claim 5, said means comprising:
    the mesh of said cage having periodic openings of a size to permit ready escape by marine organisms of a size smaller than a desired caught shrimp size, said openings being formed by periodically cutting and bending away from the interior of the cage selected mesh wires.

8. An apparatus for harvesting shrimp in an ocean environment comprising:
    an open mesh cage having a top and a bottom, interconnected by a side;
    a plurality of truncated prisms, defining an opening and an inwardly extending shrimp gate, periodically extending inward from a mid-point on said side, defining thereby a top section of said cage above said shrimp gate and a bottom section of said cage below said shrimp gate;
    each said shrimp gate being closed at in inner end by a hinged transparent flap;

means on each gate for encouraging the walking motion of shrimp;

means on each gate for encouraging the inward motion of shrimp feelers past the flap; and means for attracting plankton to the vicinity of said cage;

means for releasing undersized catch said means comprising:

the mesh of said cage having periodic openings of a size to permit ready escape by marine organisms of a size smaller than a desired caught shrimp, size, said openings being formed by periodically cutting and bending away from the interior of the cage selected mesh wires.

9. The apparatus of claim 8 further comprising:

a float, interior to said cage for flotation of said cage, and means for securing said cage at a depth in ocean water said float further comprising a mask for directing the effect of said means for attracting towards the gates.

* * * * *